(12) United States Patent
Van Den Bergh et al.

(10) Patent No.: US 9,046,200 B2
(45) Date of Patent: Jun. 2, 2015

(54) HEAT-SHRINKABLE TUBE COVERING

(71) Applicant: Berry Plastics Corporation, Evansville, IN (US)

(72) Inventors: Hans Van Den Bergh, Wilrijk (BE); Edward F Alaerts, Schriek (BE); Ciriaco Lopez, Baja, CA (US)

(73) Assignee: Berry Plastics Corporation, Evansville, IN (US)

( * ) Notice: Subject to any disclaimer, the term of this patent is extended or adjusted under 35 U.S.C. 154(b) by 0 days.

(21) Appl. No.: 13/732,950

(22) Filed: Jan. 2, 2013

(65) Prior Publication Data

US 2013/0168958 A1    Jul. 4, 2013

Related U.S. Application Data

(60) Provisional application No. 61/582,773, filed on Jan. 3, 2012.

(51) Int. Cl.

| | | |
|---|---|---|
| *F16L 47/22* | (2006.01) | |
| *F16L 13/00* | (2006.01) | |
| *B29C 61/06* | (2006.01) | |
| *F16L 58/18* | (2006.01) | |
| *F16L 13/02* | (2006.01) | |
| *F16L 13/10* | (2006.01) | |
| *F16L 47/02* | (2006.01) | |
| *B29C 63/42* | (2006.01) | |

(52) U.S. Cl.
CPC ........... *F16L 13/004* (2013.01); *B29C 61/0616* (2013.01); *F16L 58/181* (2013.01); *F16L 13/0272* (2013.01); *F16L 13/103* (2013.01); *F16L 47/02* (2013.01); *F16L 47/22* (2013.01); *B29C 63/42* (2013.01)

(58) Field of Classification Search
USPC ............ 285/187, 381.1–381.5, 294.1, 294.2, 285/915; 156/86; 428/349, 913; 174/DIG. 8
See application file for complete search history.

(56) References Cited

U.S. PATENT DOCUMENTS

| | | | | |
|---|---|---|---|---|
| 3,467,412 | A | * | 9/1969 | Gore et al. ................. 285/294.2 |
| 3,612,580 | A | * | 10/1971 | Jones ......................... 285/294.2 |
| 4,732,412 | A | * | 3/1988 | van der Linden et al. .. 174/DIG. 8 |
| 5,397,615 | A | * | 3/1995 | Van Beersel et al. ......... 428/913 |
| 6,059,319 | A | * | 5/2000 | Wyke ..................... 285/294.2 X |
| 2011/0036490 | A1 | | 2/2011 | Mamish |
| 2011/0070389 | A1 | | 3/2011 | Aulicino et al. |
| 2012/0077027 | A1 | | 3/2012 | Navarro |
| 2014/0034216 | A1 | * | 2/2014 | Bellini et al. ................... 156/86 |

FOREIGN PATENT DOCUMENTS

| | | |
|---|---|---|
| EP | 0079702 | 5/1983 |
| EP | 0188363 | 7/1986 |
| EP | 0309597 | 4/1989 |

OTHER PUBLICATIONS

International Search Report dated Jun. 20, 2013, relating to International Application No. PCT/US2013/000004.

* cited by examiner

*Primary Examiner* — Gregory Binda
(74) *Attorney, Agent, or Firm* — Barnes & Thornburg LLP

(57) ABSTRACT

A sleeve is provided for covering a pipe joint formed between two pipes that are coupled to one another to form a tube. The sleeve comprises a heat-shrinkable material that is configured to conform to the first and second pipes when heated to cover the pipe joint.

29 Claims, 5 Drawing Sheets

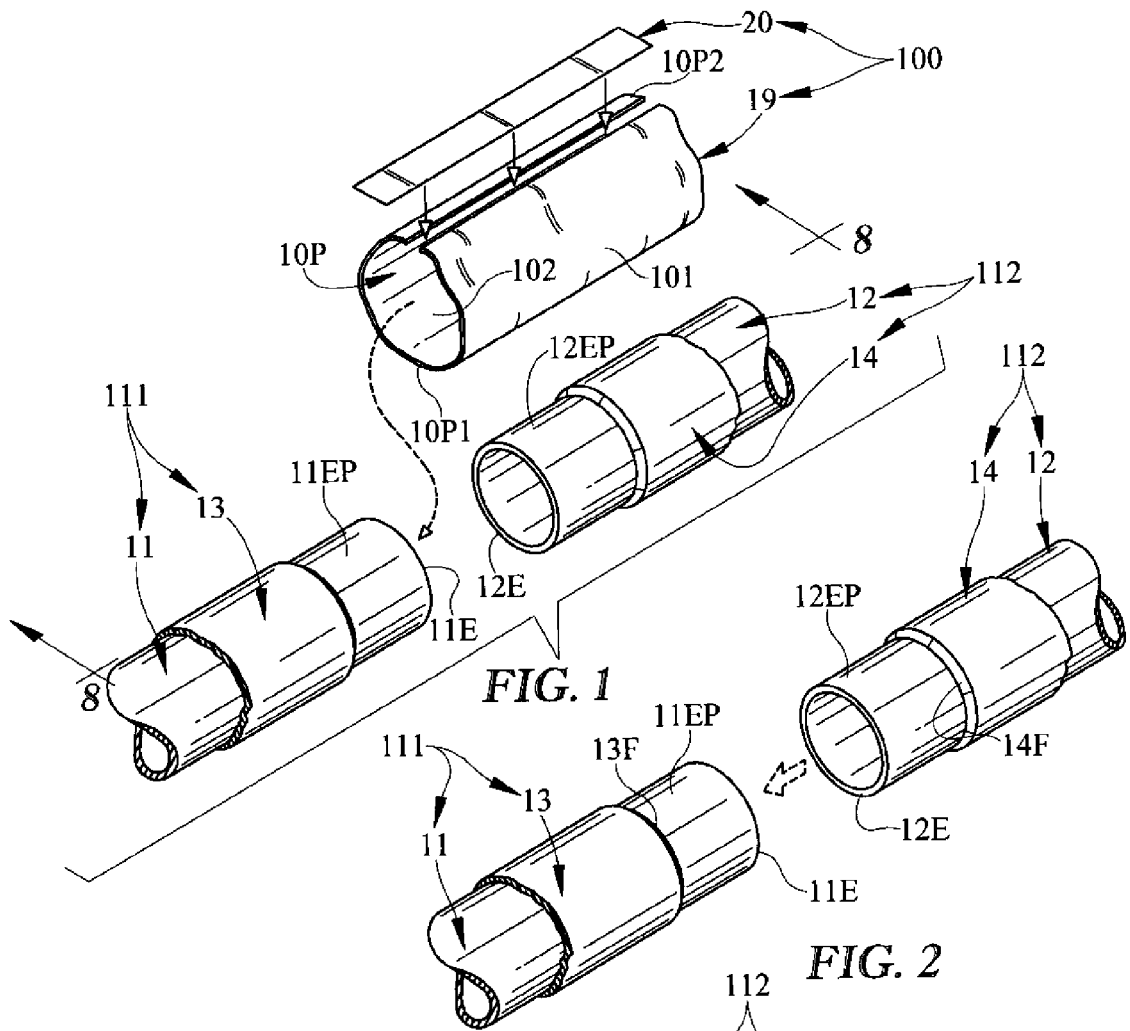
FIG. 1
FIG. 2
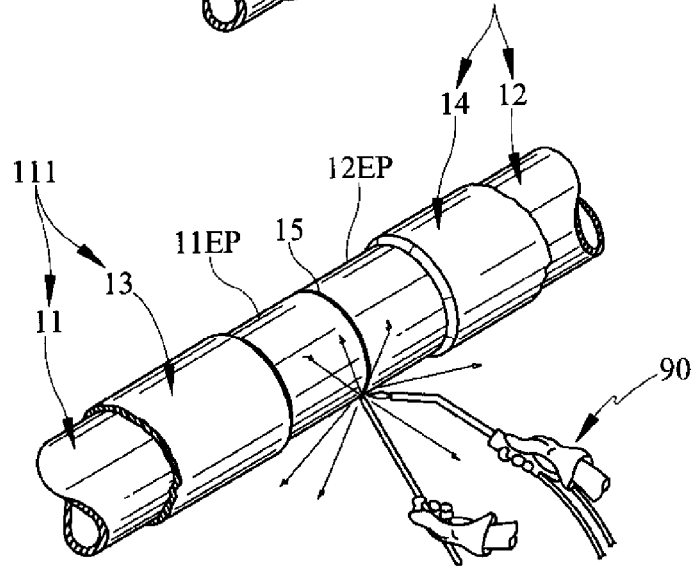
FIG. 3

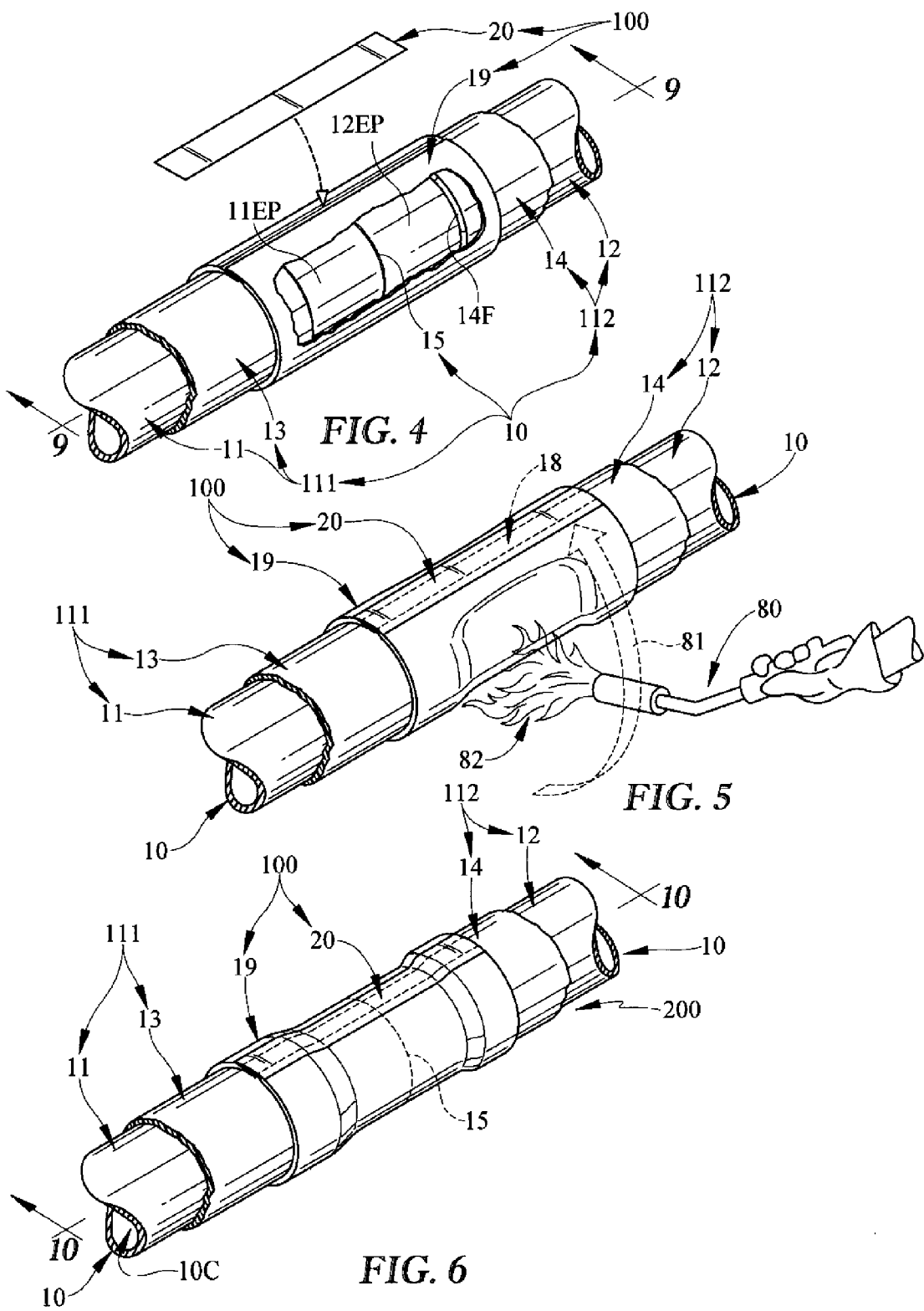

HEAT-SHRINKABLE TUBE COVERING

PRIORITY CLAIM

This application claims priority under 35 U.S.C. §119(e) to U.S. Provisional Application Ser. No. 61/582,773, filed Jan. 3, 2012, which is expressly incorporated by reference herein.

BACKGROUND

The present disclosure relates to a covering for a tube, in particular a shrinkable covering. More particularly, the present disclosure relates to a heat-shrinkable tube covering.

SUMMARY

A conduit in accordance with the present disclosure includes a sleeve formed to includes a tube-receiving passageway. In illustrative embodiments, the conduit further includes a tube arranged to extend through the tube-receiving passageway to cause a pipe joint formed at a junction between first and second pipes included in the tube to be surrounded by the sleeve.

In illustrative embodiments, the sleeve includes an exterior, heat-activated, heat-shrink layer and an interior adhesive layer coupled to the exterior, heat-activated, heat-shrink layer and to an exterior surface of the tube. The interior adhesive layer comprises tubular first and second adhesive strips made of a first adhesive and a tubular adhesive band made of a second adhesive and positioned to lie between the tubular first and second adhesive strips. The tubular adhesive band straddles and covers the pipe joint provided between the first and second pipes.

In illustrative embodiments, the first adhesive included in the first and second adhesive strips is configured to bond to an exterior pipe coating such as polyolefin applied to the first pipe included in the tube and to the second pipe included in the tube. The second adhesive included in the adhesive band is configured to bond to an exposed exterior surface of each of the first and second pipes such as an epoxy primed steel surface. Each adhesive in accordance with the present disclosure is configured to resist disbondment during exposure to high heat.

In illustrative embodiments, the sleeve includes a wraparound sheet and a sheet-retention patch. The wraparound sheet is a multi-layer sheet including the interior adhesive layer and the exterior, heat-activated, heat-shrink layer. The sheet is wrapped around the tube to cause the interior adhesive layer to mate with the tube and to produce an overlapping seam. The sheet-retention patch is coupled to the sheet to cover the seam and retain the sheet in place on the tube to cover the pipe joint.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIGS. 1-3 provide a series of views showing formation of a pipe joint between two pipes included in a tube before application of a sleeve to the pipes to cover and protect the pipe joint as suggested in FIGS. 10-11;

FIG. 1 is a perspective view showing an initial stage of forming the tube in which a first fluid-transport unit including a first pipe and a first exterior pipe coating on a portion of the first pipe is aligned with a second fluid-transport unit including a second pipe and a second exterior pipe coating on a portion of the second pipe and showing a wraparound sheet and a sheet-retention patch that later will be mated to provide a sleeve and mounted on the tube to form conduit as shown, for example, in FIG. 6;

FIG. 2 is a view similar to FIG. 1 suggesting that the two pipes are brought together so that the ends of each pipe are arranged to abut one another to form a pipe joint shown in FIG. 3;

FIG. 3 is a view similar to FIG. 2 showing the formation of the tube by welding the two ends of the pipes together at the pipe joint to establish the tube;

Figure 7A:
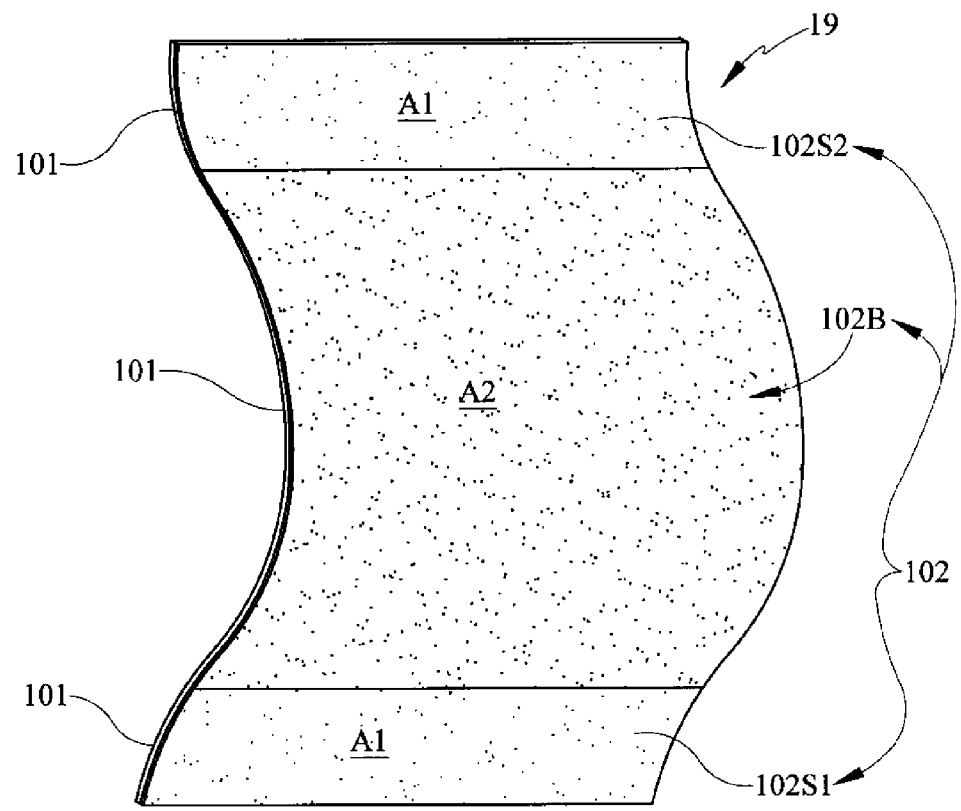
Figure 7B:
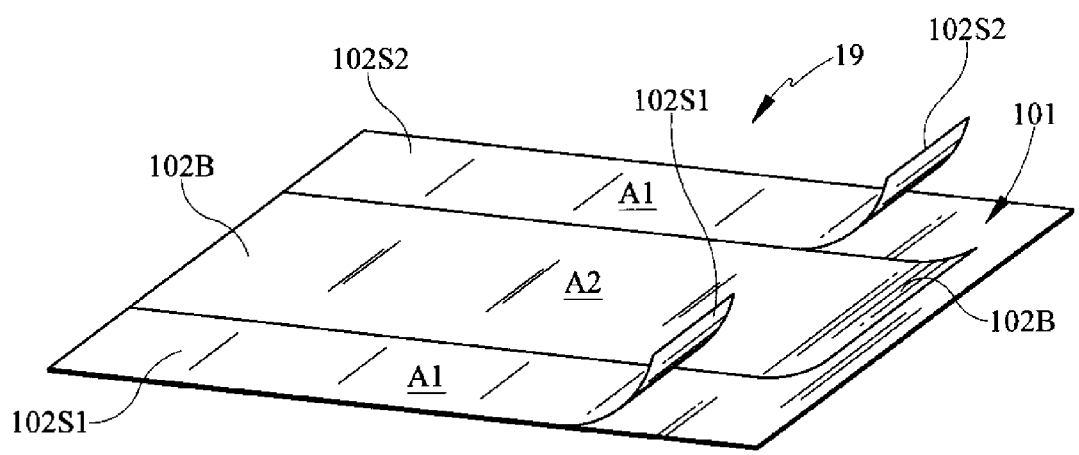
Figure 8:
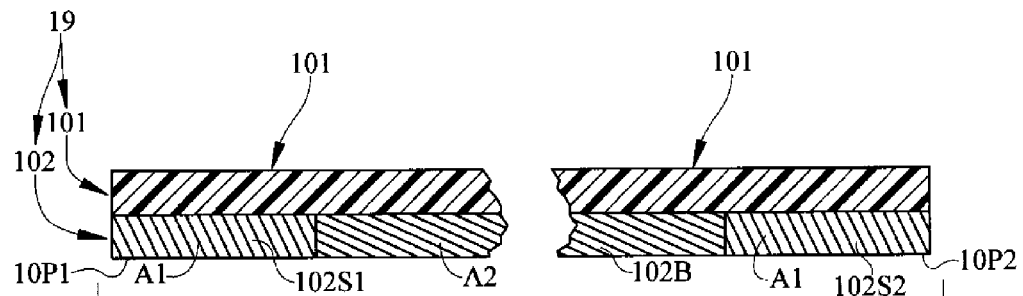
Figure 9:
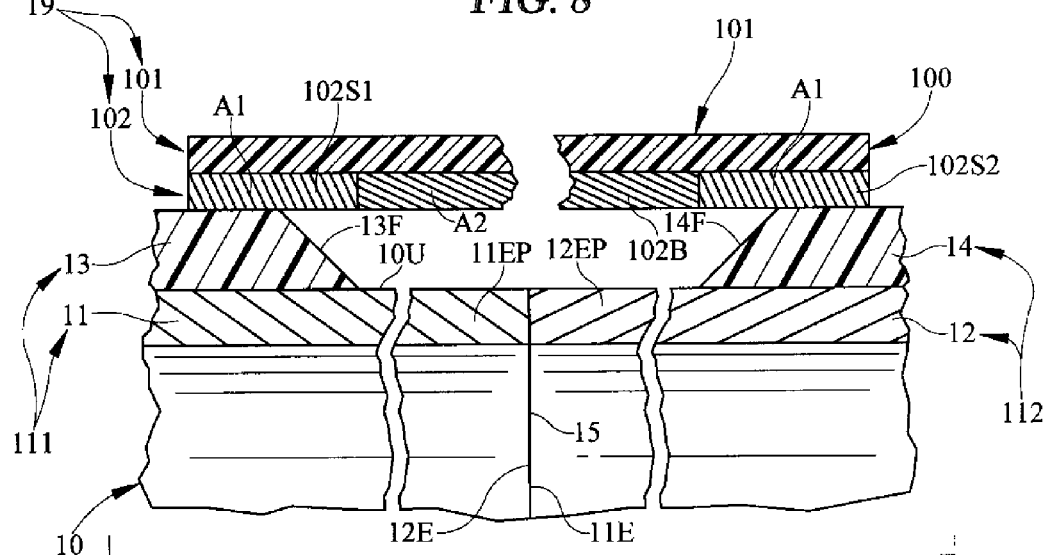
Figure 10:
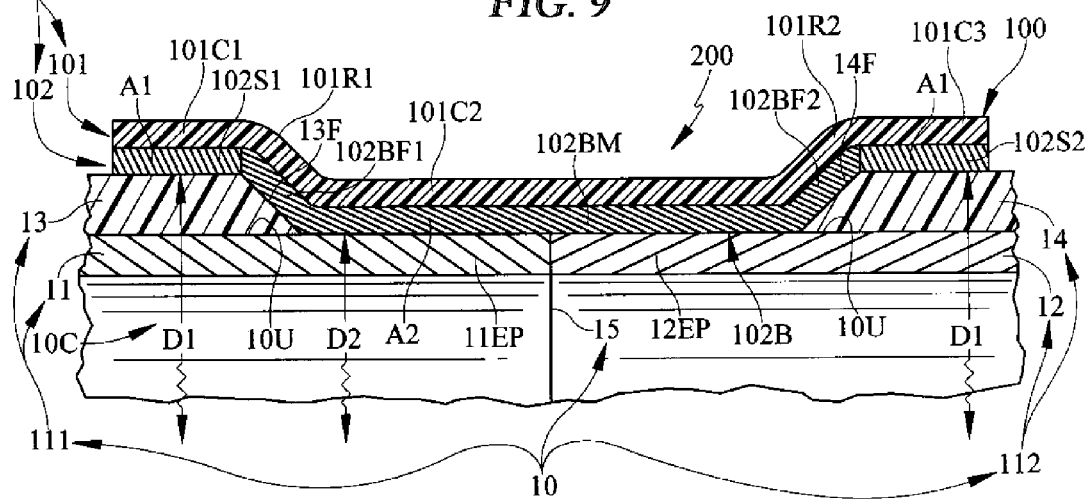
Figure 11:
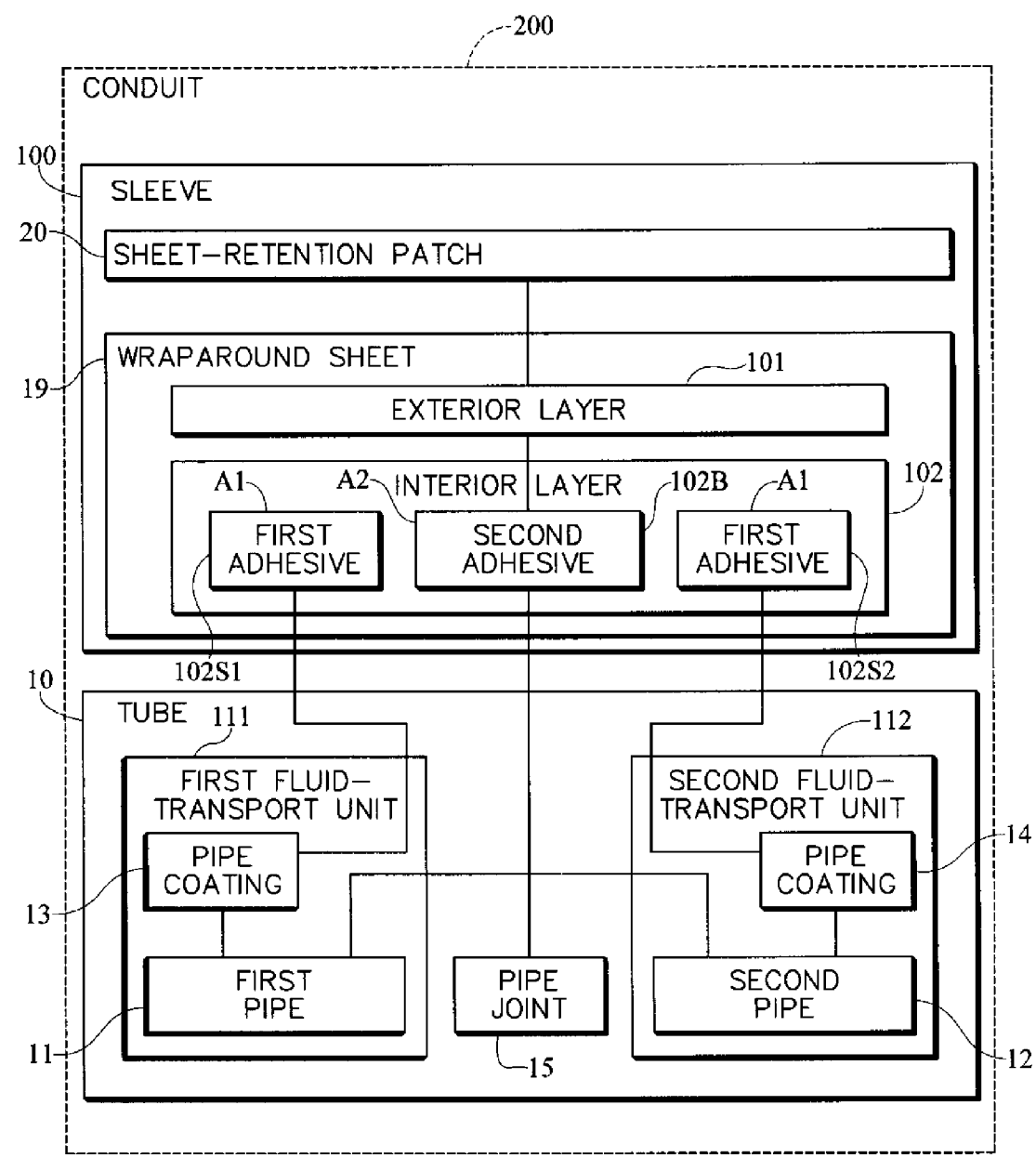

FIGS. 4-6 provide a series of views showing formation on the tube of a sleeve comprising a wraparound sheet and a sheet-retention patch to establish a conduit;

FIG. 4 is a view showing the one straight end edge of the wraparound sheet included in the sleeve being arranged to overlap another straight end edge of the wraparound sheet to wrap that sheet around the tube and the pipe joint to cause an overlapping seam to be established and suggesting that the sheet-retention patch is arranged to cover the overlapping seam and mate with the wraparound sheet to retain the wraparound sheet on the tube;

FIG. 5 is a view similar to FIG. 4 showing the sheet-retention patch coupled to the wraparound sheet to cover the overlapping seam and to form the sleeve and showing use of a torch to apply heat to all exposed exterior surfaces of the wraparound sleeve to cause an exterior, heat-activated, heat-shrink layer included in the wraparound sheet of the sleeve to shrink to assume a shape shown, for example, in FIG. 6;

FIG. 6 is a view similar to FIG. 5 after heat has been applied to the exterior, heat-activated, heat-shrink layer of the sleeve to cause the sleeve to be established around the pipe joint interconnecting the pipes included in the first and second fluid-transport units of the tube;

FIG. 7A is an enlarged perspective view of the wraparound sheet of the sleeve of FIG. 1 before it is wrapped around the tube and showing that the wraparound sleeve includes, an exterior, heat-activated, heat-shrink layer (on the left) and an interior adhesive layer (on the right) and showing that the interior adhesive layer comprises, in series, from top to bottom, a narrow first adhesive strip made of a first adhesive, a wide adhesive band made of a second adhesive, and a narrow second adhesive strip made of the first adhesive;

FIG. 7B is a diagrammatic perspective view showing portions of the interior adhesive layer peeled back to reveal the underlying exterior, heat-activated, heat-shrink layer of the wraparound sheet;

FIG. 8 is an enlarged sectional view taken along line 8-8 of FIG. 1, with portions broken away, showing that the sleeve includes (on the top) an exterior, heat-activated, heat-shrink layer, and (on the bottom and from left to right) a first adhesive strip made from the first adhesive, an adhesive band made from the second adhesive, and a second adhesive strip made from the first adhesive;

FIG. 9 is an enlarged sectional view taken along line 9-9 of FIG. 4 showing the sleeve coupled to the tube prior to application of heat and showing that (1) the first adhesive strip made of the first adhesive is arranged to engage the first exterior pipe coating of the first fluid-transport unit, (2) the second adhesive strip also made of the first adhesive is arranged to engage the second exterior pipe coating of the second fluid-transport unit, and (3) the adhesive band made of the second adhesive is arranged to lie over and cover the pipe joint provided at the junction between the first pipe included in the first fluid-transport unit and the second pipe included in the second fluid-transport unit;

FIG. 10 is an enlarged sectional view taken along line 10-10 of FIG. 6 showing the final shape of the sleeve coupled to the tube after application of heat has caused the exterior, heat-activated, heat-shrink layer of the sleeve to shrink causing the adhesive band included in the interior adhesive layer to mate with exposed portions of the first and second pipes and the pipe joint so that the pipe joint is protected; and FIG. 11 is a diagrammatic view of a portion of the sleeve coupled to the tube to form a conduit in accordance with the present disclosure and showing that the exterior, heat-activated, heat-shrink layer of the sleeve is coupled to the first adhesive included first adhesive strip, the second adhesive included in the adhesive band, and the first adhesive included in the second adhesive strip, and showing that the first adhesive strip made of the first adhesive is coupled to the first exterior pipe coating of the first fluid-transport unit, the second adhesive strip also made of the first adhesive is coupled to the second exterior pipe coating of the second fluid-transport unit, and the adhesive band made of the second adhesive is coupled to exposed portions of the first and second pipes and to the pipe joint.

DETAILED DESCRIPTION

A sleeve 100 has an exterior, heat-activated, heat-shrink layer 101 surrounding an interior adhesive layer 102 as shown illustratively in FIGS. 1, 6, and 10 and diagrammatically in FIG. 11. Sleeve 100 includes a wraparound sheet 19 and a sheet-retaining patch 20 in an illustrative embodiment as suggested in FIGS. 1 and 11. Wraparound sheet 19 includes exterior, heat-activated, heat-shrink layer 101 and interior adhesive layer 102 as suggested in FIGS. 1 and 7. Sleeve 100 is formed on a tube 10 to cover a pipe joint 15 in tube 10 and then shrunk owing to exposure to external heat 82 to form a conduit 200 as suggested in FIGS. 4-6.

Sleeve 100 has a tubular shape and covers a pipe joint 15 formed at the abutting ends of a first pipe 11 and a second pipe 12 as suggested in FIGS. 6, 10, and 11. Pipes 11, 12 cooperate to form a portion of a tube 10 extending through a tube-receiving passageway 10P defined by interior adhesive layer 102 of wraparound sheet 19 of sleeve 100 as suggested in FIGS. 10 and 11. Interior adhesive layer 102 includes a first adhesive A1 configured to adhere to exterior pipe coatings 13, 14 applied to first and second pipes 11, 12 included in tube 10 and a second adhesive A2 configured to adhere to an exterior uncoated section 10U of tube 10 including pipe joint 15 as suggested in FIGS. 10 and 11.

A conduit 200 in accordance with the present disclosure includes a tube 10 and a sleeve 100 coupled to tube 10 as suggested illustratively in FIGS. 6 and 10 and diagrammatically in FIG. 11. Sleeve 100 is formed on tube 10 in a manner shown, for example, in FIGS. 1-6.

Tube 10 includes a first fluid-transportation unit 111 comprising a first pipe 11 and a first exterior pipe coating 13, a second fluid-transportation unit 112 comprising a second pipe 12 and a second exterior pipe coating 14, and a pipe joint 15 interconnecting units 111, 112 as suggested in FIGS. 6, 10, and 11. Tube 10 is formed to include a fluid-conducting channel 10C extending therethrough as suggested in FIGS. 6 and 10.

Sleeve 100 is formed to include a tube-receiving passageway 10P, a first-end aperture 10P1 opening into tube-receiving passageway 10P at a first (left) end of sleeve 100, and a second-end aperture opening 10P2 into tube-receiving passageway 10P at an opposite second (right) end of sleeve 100 as suggested in FIGS. 1 and 8. Sleeve 100 includes an interior adhesive layer 102 formed to define tube-receiving passageway 10P and an exterior heat-activated heat-shrink layer 101 arranged to surround and mate with interior adhesive layer 102 without closing the first-end and second-end apertures 10P1, 10P2.

Interior adhesive layer 102 includes, in series, a first narrow adhesive strip 102S1 made of first adhesive material A1 and configured to define first-end aperture 10P1, a narrow second adhesive strip 102S2 made of first adhesive material A1 and configured to define second-end aperture 10P2, and a relatively wider adhesive band 102B made of second adhesive material A2 as suggested in FIGS. 7A, 7B, 8-10, and 11. Adhesive band 102B is arranged to lie between the first and second adhesive strips 102S1, 102S2 as suggested in FIGS. 7A, 7B, 10, and 11.

Adhesive band 102B is arranged to interconnect first and second adhesive strips 102S1, 102S2 in illustrative embodiments of the present disclosure. First adhesive strip 102S1 has a tubular shape and is characterized generally by a first inner diameter D1 as suggested in FIG. 10. Second adhesive strip 102S2 has a tubular shape and is characterized by the first inner diameter D1. Adhesive band 102B includes a tubular middle portion 102BM characterized by a second inner diameter D2 that is less than the first inner diameter D1 associated with each of the first and second adhesive strips 102S1, 102S2 as suggested in FIGS. 6 and 10.

Adhesive band 102B further includes first funnel 102BF1 and second funnel 102BF2 as suggested in FIGS. 6 and 10. First funnel 102BF1 is arranged to interconnect first adhesive strip 102S1 and the tubular middle portion 102BM of adhesive band 102B. Second funnel 102BF2 is arranged to interconnect second adhesive strip 102S2 and tubular middle portion 102BM of the adhesive band 102B. Each of first and second funnels 102BF1, 102BF2 are bell-shaped as shown, for example, in FIG. 10.

As suggested in FIGS. 6 and 10, exterior, heat-activated, heat-shrink layer 101 includes, in series, a first annular collar 101C1 coupled to first adhesive strip 102S1, a first transition ring 101R1 coupled to the first annular collar 101C1 and to first funnel 102BF1 of adhesive band 102B, a second annular collar 101C2 coupled to first transition ring 101R1 and to tubular middle portion 102BM of adhesive band 102B, a second transition ring 101R2 coupled to second annular collar 101C2 and to second funnel 102BF2 of adhesive band 102B, and a third annular collar 101C3 coupled to the transition ring 102R2 and to second adhesive strip 102S2. Second annular collar 101C2 is characterized by an outer diameter that is less than an outer diameter of each of the first and third annular collars 101C1, 101C3 as suggested in FIGS. 6 and 10. Each of the first, second, and third annular collars 101C1, 101C2, 101C3 is tube-shaped. Each of first and second transition rings 101R1, 101R2 is funnel-shaped as suggested in FIGS. 6 and 10.

Tube 10 is arranged to extend through tube-receiving passageway 10P formed in sleeve 100 as suggested in FIGS. 6 and 10. Tube 10 includes first and second fluid-transport units 111, 112.

First fluid-transport unit 111 comprises a first pipe 11 and a first exterior pipe coating 13 coupled to an exterior surface of first pipe 11 as suggested in FIGS. 1, 10, and 11. First exterior pipe coating 13 is arranged to lie in spaced-apart relation to a downstream end 11E of first pipe 11 to form a first exposed portion 11EP of first pipe 11 therebetween as suggested in FIGS. 1 and 9.

Second fluid-transport unit 112 comprises a second pipe 12 and a second exterior pipe 14 coating coupled to an exterior surface of second pipe 12 as suggested in FIGS. 1, 10, and 11. Second exterior pipe coating 14 is arranged to lie in spaced-apart relation to an upstream end 12E of second pipe 12 to form a second exposed portion 12EP of second pipe 12 therebetween as suggested in FIGS. 1 and 9.

Downstream end 11E of first exposed portion 11EP of the first pipe 11 is mated to upstream end 12E of second exposed portion 12EP of second pipe 12 to establish a pipe joint 15 therebetween. Exposed portions 11EP, 12EP, and pipe joint 15 cooperate to define an exterior uncoated section 10U of tube 10 located between first and second exterior pipe coatings 13, 14 as suggested in FIGS. 9 and 10.

First adhesive strip 102S1 of interior adhesive layer 102 of sleeve 100 is coupled to first exterior pipe coating 13 as suggested in FIGS. 9-11. Adhesive band 102B of the interior adhesive layer 102 is coupled to first and second exposed portions 11EP, 12EP to cover pipe joint 15. Second adhesive strip 102S2 of interior adhesive layer 102 of sleeve 100 is coupled to second exterior pipe coating 14.

Adhesive band 102B includes a tubular middle portion 102BM coupled to the exterior uncoated section 10U of tube 10 to cover pipe joint 15, a first funnel 102BF1 arranged to interconnect first adhesive strip 102S1 and tubular middle portion 102BM, and a second funnel 102BF2 arranged to interconnect tubular middle portion 102BM and second adhesive strip 102S2 as suggested in FIG. 10.

First exterior pipe coating 13 is chamfered in an illustrative embodiment to provide a negatively sloping beveled frustoconical surface so as to include an upstream end face 13F that is arranged to face toward second exterior pipe coating 14 as suggested in FIG. 10. Second exterior pipe coating 14 is chamfered in an illustrative embodiment to provide a positively sloping beveled frustoconical surface so as to include a downstream end face 14F that is arranged to face toward upstream end face 13F of first exterior pipe coating 13 as also suggested in FIG. 10. Tubular middle portion 102BM of adhesive band 102B is arranged to lie between and in spaced-apart relation to each of the downstream and upstream end faces 13F, 14F.

Adhesive band 102B is arranged to interconnect first and second adhesive strips 102S1, 102S2 as suggested in FIGS. 7A, 7B, and 10. First adhesive strip 102S1 of interior adhesive layer 102 of sleeve 100 is arranged to lie in spaced-apart relation to the exterior uncoated section 10U of tube 10 as suggested in FIG. 10. Adhesive band 102B includes a tubular middle portion 102BM that is coupled to first and second exposed portions 11EP, 12EP to cover pipe joint 15 and a first funnel 102BF1 arranged to interconnect first adhesive strip 102S1 and tubular middle portion 102BM.

As shown in FIG. 7, a sleeve 100 in accordance with the present disclosure includes heat-shrink layer 101 and an adhesive layer 102 coupled to heat-shrink layer 101. Sleeve 100 is used to protect an area where two pipes 11, 12 are joined together as suggested in FIGS. 1-6. Heat-shrink layer 101 of sleeve 100 has heat-shrinking properties that allow sleeve 100 to shrink and conform to the shape of the underlying structure as shown in FIG. 6 when external heat 82 is applied as shown in FIG. 5.

Adhesive layer 102 includes, in series, a first adhesive strip 102S1, a second adhesive strip 102S2, and an adhesive band 102B as shown in FIGS. 7A and 7B. As suggested in FIGS. 9-11, first and second adhesive strips 102S1, 102S2 are configured to mate with exterior pipe coatings 13, 14 applied to pipes 11, 12 and adhesive band 102B is configured to mate with an area including pipe joint 15 provided on pipes 11, 12. First and second adhesive strips 102S1, 102S2 are made from a first adhesive A1 that interconnects heat-shrink layer 101 and exterior pipe coatings 13, 14. Adhesive band 102B is made from a second adhesive A2 that interconnects heat-shrink layer 101 and a portion of exterior uncoated section 10U of tube 10 at the junction of pipes 11, 12.

A sleeve 100 in accordance with the present disclosure covers portions of a tube 10 comprising first fluid-transport unit 111 and a second fluid-transport unit 112. First fluid-transport unit 111 includes a first pipe 11 and a first exterior pipe coating 14 as suggested, for example, in FIGS. 1-6. Second fluid-transport unit 112 includes a second pipe 12 and a second exterior pipe coating 13. At the ends of first fluid-transport unit 111, first pipe 11 extends beyond first exterior pipe coating 14 leaving a first exposed portion 11EP shown, for example, in FIG. 2. Similarly, second fluid-transport unit 112 extends beyond second exterior pipe coating 13 leaving a second exposed portion 12EP shown, for example, in FIG. 2.

Sleeve 100 is used to cover the exposed portions 11EP, 12EP in a series of illustrative steps shown in FIGS. 1-6. First, fluid-transport units 111, 112 are aligned in spaced-apart relation to one another as suggested in FIG. 1. Second, fluid-transport units 111, 112 are brought together, as suggested in FIG. 2. Third, a welder 90 welds pipes 11, 12 to establish a pipe joint 15 as shown in FIG. 3. Fourth, sheet 19 of sleeve 100 is wrapped around pipes 11, 12 and pipe joint 15 to establish an overlapping seam 18 (shown in phantom in FIG. 5) after heat has dissipated from pipe joint 15. Fifth, a sheet-retention patch 20 is coupled to wraparound sheet 19 of sleeve 100 to cover seam 18 so that sleeve 10 is retained in place during application of heat 82 to sleeve 100. Finally, heat 82 is applied to sleeve 100 placed over pipe joint 15 illustratively by a gas torch 80 as shown in FIG. 5 to cover pipe joint 15 as shown in FIG. 6.

As shown in FIG. 3, pipe joint 15 is used to interconnect the ends of pipes 11, 12 by welding. Illustratively, first fluid-transport unit 111 may be connected to second pipe fluid-transport 112 using a TIG welder 90, as shown in FIG. 3. It is within the scope of this disclosure to use any suitable welding or coupling technique. After joining first and second fluid-transport units 111, 112, sleeve 100 can be arranged over first fluid transport unit 111 and second fluid-transport units 112 so as to cover pipe joint 15, first exposed portion 11EP, and second exposed portion 12EP, as suggested in FIG. 4.

As shown in FIG. 5, sleeve 100 is heated using gas torch 80 or other suitable heater to at least a predetermined temperature to cause heat-shrink layer 101 to shrink and conform to exposed portions 11EP, 12EP of first and second fluid-transport units 111, 112. Using an illustrative technique suggested in FIG. 5, gas torch 80 is moved around the circumference of sleeve 100 in direction 81 using a side-to-side motion to apply heat 82 to all exposed exterior surfaces of sleeve 100.

Sleeve 100 includes heat-shrink layer 101 and adhesive layer 102 as suggested in FIGS. 7A and 7B. Adhesive layer 102 includes first adhesive strip 102S1, second adhesive strip 102S2, and adhesive band 102B. As shown in FIGS. 7-11, adhesive band 102B is positioned to lie between and interconnect first and second adhesive strips 102S1, 102S2. As an illustrative example, first and second adhesive strips 102S1, 102S2 are made from a first adhesive A1 while adhesive band 102B is made from a second adhesive A2 that is different from the first adhesive A2.

As suggested in FIGS. 8-11, first and second adhesive strips 102S1, 102S2 are configured to couple to associated exterior pipe coatings 13, 14. First and second adhesive strips 102S1, 102S2 are made from first adhesive A1 which is configured to couple to exterior pipe coatings 13, 14 at a first temperature. As an example, first adhesive A1 is a mastic or pressure-sensitive adhesive that is responsive at the first temperature. As an example, an outer surface exterior pipe coatings 13, 14 is brought to the first temperature by exposure to heat 82 provided by use of torch 80. First temperature is relatively lower than a melt temperature of exterior pipe coatings 13, 14. As a result, exterior pipe coatings 13, 14 are preserved during installation of sleeve 10 on pipes 11, 12.

Adhesive band 102B is configured to couple to an area including pipe joint 15 as suggested in FIG. 9 and shown in FIGS. 10 and 11. As shown in FIGS. 1 and 2, exposed portions 11EP, 12EP of pipes 11, 12 and pipe joint 15 cooperate to establish that area. Adhesive band 102B is made from second adhesive A2 which is configured to couple to the exterior uncoated section 10U in that area at a relatively higher second temperature. Second temperature is greater than first temperature and is confined to that area so as to minimize first temperature in exterior pipe coatings 13, 14. As an example, second adhesive A2 is a hot-melt adhesive that is activated at the second temperature. In one example, second temperature is about 80 degrees Celsius. The area including exterior uncoated section 10U may be brought to second temperature by use of torch 80. As a result of only heating that area to second temperature, exterior pipe coatings 13, 14 may be maintained at the first temperature.

In illustrative embodiments, heat-shrink layer 101 is heat shrinkable when exposed to heat above a predetermined temperature. As an example, heat-shrink layer 101 is made from a polyolefin-based sheet that shrinks by about 5% to about 200%, based on the reduction in length, upon heating. In another embodiment, the polyolefin layer shrinks by about 10% to about 60%, based on the reduction in length, upon heating. In yet another embodiment, the polyolefin layer shrinks by about 25% to about 50%, based on the reduction in length, upon heating. In one embodiment, the polyolefin layer shrinks from about 10% to about 60%, based on the reduction in length, upon heating.

In one embodiment, heating includes raising the temperature of the polyolefin layer to at least about 60 degrees Celsius. In another embodiment, heating includes raising the temperature of the polyolefin layer into a range of about 60 degrees Celsius to about 200 degrees Celsius. In yet another embodiment, heating includes raising the temperature of the polyolefin layer into a range of about 100 degrees Celsius to about 160 degrees Celsius. In one embodiment, the shrink force is greater than about 30 psi, as determined by ASTM D-638 at 150 degrees C. In another embodiment, the shrink force is greater than about 40 psi, as determined by ASTM D-638 at 150 degrees C.

Sleeve 100 provides minimized installation time of to mount on tube 10. Installation equipment may include only torch 80 which allows for minimized capital equipment costs. Specialized equipment, other than torch 80, may also be minimized. Furthermore, minimized first temperature provides for simplified material formulations and maximized reliability and reproducibility during installation.

The invention claimed is:

1. A conduit comprising
a sleeve formed to include a tube-receiving passageway, a first-end aperture opening into the tube-receiving passageway at a first end of the sleeve, and a second-end aperture opening into the tube-receiving passageway at an opposite second end of the sleeve,
wherein the sleeve includes an interior adhesive layer formed to define the tube-receiving passageway and an exterior heat-activated heat-shrink layer arranged to surround and mate with the interior adhesive layer without closing the first-end and second-end apertures, and
wherein the interior adhesive layer includes, a first means for defining the first-end aperture opening and for adhesively coupling to an exterior pipe coating by heating to a first temperature, a second means for defining the second-end aperture opening and for coupling to an exterior pipe coating by heating to the first temperature, and a third means between the first means and second means for adhesively coupling to an exterior uncoated pipe by heating to a second temperature that is greater than the first temperature.

2. The conduit of claim 1, wherein the third means for adhesively coupling is arranged to interconnect the first and second means.

3. The conduit of claim 1, wherein the first means has a tubular shape and is characterized by a first inner diameter, the second means has a tubular shape and is characterized by the first inner diameter, and the third means for adhesively coupling includes a tubular middle portion characterized by a second inner diameter that is less than the first diameter.

4. The conduit of claim 1, wherein each of the first and second means and the third means for adhesively coupling has a tubular shape and the third means for adhesively coupling further includes a first funnel arranged to interconnect the first means and the tubular middle portion of the third means for adhesively coupling and a second funnel arranged to interconnect the second means and the tubular middle portion of the third means for adhesively coupling.

5. The conduit of claim 4, wherein the heat-activated heat-shrink layer includes, in series, a first annular collar coupled to the first means, a first transition ring coupled to the first annular collar and to the first funnel of the third means for adhesively coupling, a second annular collar coupled to the first transition ring and to the tubular middle portion of the third means for adhesively coupling, a second transition ring coupled to the second annular collar and to the second funnel of the third means for adhesively coupling, and a third annular collar coupled to the second transition ring and to the second means.

6. The conduit of claim 5, wherein the second annular collar is characterized by an outer diameter that is less than an outer diameter of each of the first and third annular collars.

7. The conduit of claim 5, wherein each of the first, second, and third annular collars is tube-shaped and each of the first and second transition rings is funnel-shaped.

8. The conduit of claim 1, further comprising a tube arranged to extend through the tube-receiving passageway formed in the sleeve, the tube including a first fluid-transport unit comprising a first pipe and a first exterior pipe coating coupled to an exterior surface of the first pipe and arranged to lie in spaced-apart relation to a downstream end of the first pipe to form a first exposed portion of the first pipe therebetween and a second fluid-transport unit comprising a second pipe and a second exterior pipe coating coupled to an exterior surface of the second pipe and arranged to lie in spaced-apart relation to an upstream end of the second pipe to form a second exposed portion of the second pipe therebetween, the downstream end of the first exposed portion of the first pipe is mated to the upstream end of the second exposed portion of the second pipe to establish a pipe joint therebetween and to define an exterior uncoated section of the tube located between the first and second exterior pipe coatings, and
wherein the first means of the interior adhesive layer of the sleeve is coupled to the first exterior pipe coating and the third means for adhesively coupling of the interior adhesive layer is coupled to the first and second exposed portions to cover the pipe joint.

9. The conduit of claim 8, wherein the second means of the interior adhesive layer of the sleeve is coupled to the second exterior pipe coating.

10. The conduit of claim 9, wherein the third means for adhesively coupling includes a tubular middle portion coupled to the exterior uncoated section of the tube to cover the pipe joint, a first funnel arranged to interconnect the first means and the tubular middle portion, and a second funnel arranged to interconnect the tubular middle portion and the second means.

11. The conduit of claim 10, wherein the heat-activated heat-shrink layer includes, in series, a first annular collar coupled to the first means, a first transition ring coupled to the first annular collar and to the first funnel of the third means for adhesively coupling, a second annular collar coupled to the first transition ring and to the tubular middle portion of the third means for adhesively coupling, a second transition ring coupled to the second annular collar and to the second funnel of the third means for adhesively coupling, and a third annular collar coupled to the second transition ring and to the second means.

12. The conduit of claim 11, wherein the second annular collar is characterized by an outer diameter that is less than an outer diameter of each of the first and third annular collars.

13. The conduit of claim 12, wherein each of the first, second, and third annular collars is tube-shaped and each of the first and second transition rings is funnel-shaped.

14. The conduit of claim 9, wherein the first exterior pipe coating includes an upstream end face that is beveled and arranged to face toward the second exterior pipe coating, the second exterior pipe coating includes a downstream end face that is beveled and arranged to face toward the upstream end face of the first exterior pipe coating, and the tubular middle portion of the third means for adhesively coupling is arranged to lie between and in spaced-apart relation to each of the upstream and downstream end faces.

15. The conduit of claim 14, wherein the third means for adhesively coupling is arranged to interconnect the first and second means.

16. The conduit of claim 8, wherein the first means of the interior adhesive layer of the sleeve is arranged to lie in spaced-apart relation to the exterior uncoated section of the tube.

17. The conduit of claim 16, wherein the third means for adhesively coupling includes a tubular middle portion that is coupled to the first and second exposed portions to cover the pipe joint and a first funnel arranged to interconnect the first means and the tubular middle portion, and to lie in spaced-apart relation to the first exposed portion of the first pipe to form an open cavity therebetween.

18. The conduit of claim 8, wherein the exterior surface of the first pipe and the exterior surface of the second pipe are epoxy primed steel surfaces.

19. The conduit of claim 18, wherein the epoxy primed steel surfaces are positioned to bond to the adhesive band.

20. The conduit of claim 19, wherein the second means is a hot-melt adhesive.

21. The conduit of claim 8, wherein the first exterior pipe coating and the second exterior pipe coating comprise polyolefin.

22. The conduit of claim 1, wherein the second means comprises a hot-melt adhesive.

23. A conduit comprising
a sleeve including a first means for forming a first tube-receiving passageway and for coupling to a first exterior pipe coating at a first temperature, and an exterior heat-activated heat-shrink layer arranged to surround and mate with the first means, a second means for forming a second tube-receiving passageway and for coupling to a second exterior pipe coating at the first temperature, third means for coupling to an exterior uncoated pipe at a second temperature that is greater than the first temperature, and
a tube arranged to extend through the first tube-receiving passageway and through the second tube-receiving passageway, the tube including a first pipe coupled to a second pipe at a pipe joint, the first exterior pipe coating arranged to lie in spaced-apart relation to the pipe joint and between the first pipe and the first means, and the second exterior pipe coating arranged to lie in spaced-apart relation to each of the pipe joint and the first exterior pipe coating and between the second pipe and the second means,
wherein the first means is mated adhesively to the exterior heat-activated heat-shrink layer and the first exterior pipe coating without mating with the first pipe,
wherein the second means is mated adhesively to the exterior heat-activated heat-shrink layer and the second exterior pipe coating without mating with the second pipe, and
wherein the third means is mated adhesively to the first and second pipes to retain the sleeve in a stationary position on the tube covering the pipe joint.

24. The conduit of claim 23, wherein the third means for adhesively coupling includes a tubular middle portion mated adhesively to the first and second pipes and arranged to cover the pipe joint, a first funnel arranged to interconnect the first means and the tubular middle portion, and a second funnel arranged to interconnect the tubular middle portion and the second means, and the heat-activated heat-shrink layer includes, in series, a first annular collar coupled to the first means, a first transition ring coupled to the first annular collar and to the first funnel of the adhesive band, a second annular collar coupled to the first transition ring and to the tubular middle portion of the adhesive band, a second transition ring coupled to the second annular collar and to the second funnel of the third means for adhesively coupling, and a third annular collar coupled to the second transition ring and to the second means.

25. The conduit of claim 24, wherein the third means for adhesively coupling is arranged to interconnect the first and second means.

26. A conduit comprising
a sleeve formed to include a tube-receiving passageway, a first-end aperture opening into the tube-receiving passageway at a first end of the sleeve, and a second-end aperture opening into the tube-receiving passageway at an opposite second end of the sleeve,
wherein the sleeve includes an interior adhesive layer formed to define the tube-receiving passageway and an exterior heat-activated heat-shrink layer arranged to surround and mate with the interior adhesive layer without closing the first-end and second-end apertures,
wherein the interior adhesive layer includes, a first means for defining the first-end aperture opening and for adhesively coupling to an exterior pipe coating by heating to a first temperature, a second means for defining the second-end aperture opening and for coupling to an exterior pipe coating by heating to the first temperature, and a third means between the first means and second means for adhesively coupling to an exterior uncoated pipe by heating to a second temperature that is greater than the first temperature, wherein the second means comprises a hot-melt adhesive, and wherein the hot-melt adhesive is responsive at a temperature below about 80 degrees Celsius.

27. A conduit comprising
a sleeve formed to include a tube-receiving passageway, a first-end aperture opening into the tube-receiving passageway at a first end of the sleeve, and a second-end aperture opening into the tube-receiving passageway at an opposite second end of the sleeve,
wherein the sleeve includes an interior adhesive layer formed to define the tube-receiving passageway and an exterior heat-activated heat-shrink layer arranged to surround and mate with the interior adhesive layer without closing the first-end and second-end apertures,
wherein the interior adhesive layer includes, a first means for defining the first-end aperture opening and for adhesively coupling to an exterior pipe coating by heating to a first temperature, a second means for defining the second-end aperture opening and for coupling to an exterior pipe coating by heating to the first temperature, and a third means between the first means and second means for adhesively coupling to an exterior uncoated pipe by heating to a second temperature that is greater than the first temperature,
wherein the second means comprises a hot-melt adhesive, and wherein the hot-melt adhesive is activated at about 80 degrees Celsius.

28. A conduit comprising
a sleeve formed to include a tube-receiving passageway, a first-end aperture opening into the tube-receiving passageway at a first end of the sleeve, and a second-end aperture opening into the tube-receiving passageway at an opposite second end of the sleeve,
wherein the sleeve includes an interior adhesive layer formed to define the tube-receiving passageway and an exterior heat-activated heat-shrink layer arranged to surround and mate with the interior adhesive layer without closing the first-end and second-end apertures,
wherein the interior adhesive layer includes, a first means for defining the first-end aperture opening and for adhesively coupling to an exterior pipe coating by heating to a first temperature, a second means for defining the second-end aperture opening and for coupling to an exterior pipe coating by heating to the first temperature, and a third means between the first means and second means for adhesively coupling to an exterior uncoated pipe by heating to a second temperature that is greater than the first temperature;
a tube arranged to extend through the tube-receiving passageway formed in the sleeve, the tube including a first fluid-transport unit comprising a first pipe and a first exterior pipe coating coupled to an exterior surface of the first pipe and arranged to lie in spaced-apart relation to a downstream end of the first pipe to form a first exposed portion of the first pipe therebetween and a second fluid-transport unit comprising a second pipe and a second exterior pipe coating coupled to an exterior surface of the second pipe and arranged to like lie in spaced-apart relation to an upstream end of the second pipe to form a second exposed portion of the second pipe therebetween, the downstream end of the first exposed portion of the first pipe is mated to the upstream end of the second exposed portion of the second pipe to establish a pipe joint therebetween and to define an exterior uncoated section of the tube located between the first and second exterior pipe coatings,
wherein the first means of the interior adhesive layer of the sleeve is coupled to the first exterior pipe coating and the third means for adhesively coupling of the interior adhesive layer is coupled to the first and second exposed portions to cover the pipe joint, and
wherein the first exposed portion of the first pipe and the second exposed portion of the second pipe have been exposed to a temperature of about 80 degrees Celsius and the first exterior pipe coating and the second exterior pipe coating have been exposed to a temperature below about 80 degrees Celsius.

29. A conduit comprising
a sleeve formed to include a tube-receiving passageway, a first-end aperture opening into the tube-receiving passageway at a first end of the sleeve, and a second-end aperture opening into the tube-receiving passageway at an opposite second end of the sleeve,
wherein the sleeve includes an interior adhesive layer formed to define the tube-receiving passageway and an exterior heat-activated heat-shrink layer arranged to surround and mate with the interior adhesive layer without closing the first-end and second-end apertures, and
wherein the interior adhesive layer includes, a first means for defining the first-end aperture opening and for adhesively coupling to an exterior pipe coating by heating to a first temperature, a second means for defining the second-end aperture opening and for coupling to an exterior pipe coating by heating to the first temperature; a third means between the first means and second means for adhesively coupling to an exterior uncoated pipe by heating to a second temperature that is greater than the first temperature, and wherein the heat-activated heat-shrink layer shrinks at about 100 degrees Celsius to about 160 degrees Celsius.

* * * * *